UNITED STATES PATENT OFFICE.

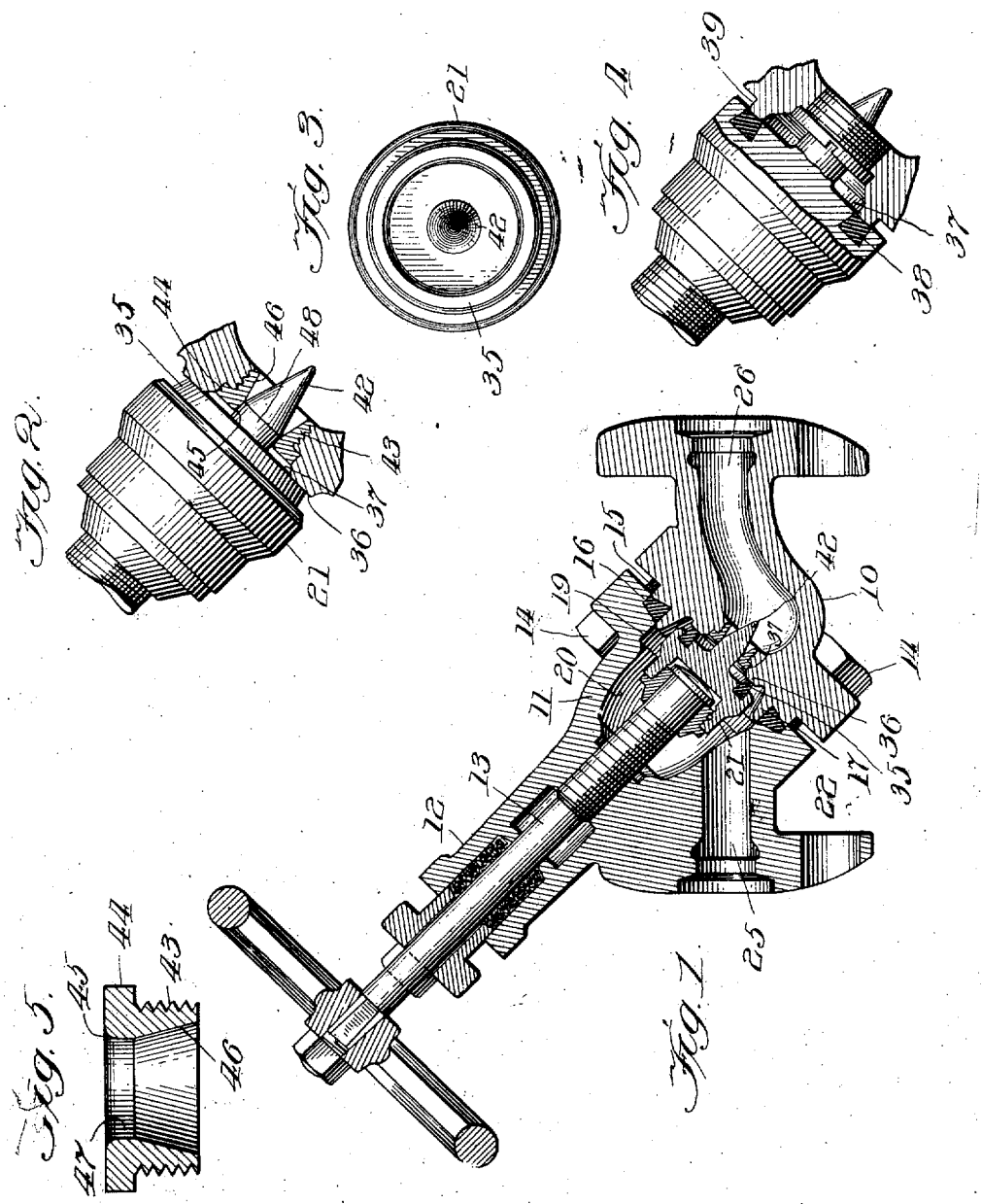

WILLIAM L. OSBORNE, OF CHICAGO, ILLINOIS.

VALVE.

973,551.   Specification of Letters Patent.   Patented Oct. 25, 1910.

Application filed July 23, 1909. Serial No. 509,155.

*To all whom it may concern:*

Be it known that I, WILLIAM L. OSBORNE, a citizen of the United States, and a resident of Chicago, in the county of Cook and State of Illinois, have invented certain new and useful Improvements in Valves; and I do hereby declare that the following is a full, clear, and exact description thereof, reference being had to the accompanying drawings, and to the letters of reference marked thereon, which form a part of this specification.

This invention relates to improvements in valves and the invention refers more specifically to an improved combined cut off and expansion valve adapted to be inserted in a pipe leading from a space of high pressure to a space of lower pressure to cut off the flow of fluid from one space to the other and to control the expansion, at the valve, of fluid passing from the space of high pressure to the space of low pressure. For instance, the valve may be used in a pipe or conduit which connects the expansion chamber of a refrigerator or the like with a source supplying the refrigerating liquid that expands in said chamber to produce the refrigerating effect.

Among the objects of the invention is to provide an improved construction of valve for this purpose arranged to control the expansion of the fluid, and also to avoid wear on the seating faces of the shut off valve and valve seat due to the high velocity of the fluid passing through the valve.

The invention consists in the matters hereinafter set forth and more particularly pointed out in the appended claims.

In the drawings, Figure 1 is a central longitudinal section of the valve casing and the valve piece, showing the valve stem in elevation. Fig. 2 is an enlarged view of the valve piece, showing the valve seat in section. Fig. 3 is a bottom plan view of the valve piece. Fig. 4 is a view partially in elevation and partially in section of the valve seat and valve piece, showing a modification. Fig. 5 is a sectional view of the renewable expansion and wear ring of the valve.

The casing of the valve herein shown is composed of two principal parts, the valve body 10 and the bonnet 11, the latter provided with a neck 12 outwardly through which the valve stem 13 extends. The meeting ends of the body and bonnet are inclined at an angle of forty-five degrees and are bolted together by bolts 14—14 which extend through flanges of the valve casing parts. Said meeting end faces are provided with mutually interfitting concentric annular offsets adapted to hold the parts laterally in place with respect to each other. As herein shown the body 10 is provided with an annular shoulder 15 which fits a correspondingly annular shoulder 16 of the bonnet 11. The body is provided also at a distance inside of, and concentric with the shoulder 15, with an annular flange 17 which extends into the cylindric opening 19 of the chamber 20 that receives the swiveled valve piece 21 carried by the lower end of the stem 13. The valve stem 13 has screw-threaded connection with the bonnet and is provided at its outer end with a hand wheel whereby the stem rises and falls when the valve is opened and closed. A non-rising stem may also be employed.

22 designates a packing ring which is interposed between the two parts of the valve casing in the annular space between the shoulder 16 and flange 17. The ends of said ring are tapered or made conical and fit correspondingly tapered surfaces of the two parts of the valve casing, whereby when said ring is placed under compression through the action of the bolts 14, the packing ring is compressed against all the metal surfaces, which completely surround the same, to provide a fluid tight joint between the valve casing parts.

The construction described permits one of the valve casing parts to be rotated relatively to the other about the axis of the valve stem to bring the inlet and outlet passages 25, 26 of the valve either parallel with each other, for use in a straight line of pipe, or at right angles to each other, as required to connect the valve in a right angle of a deflected line of piping. My improvements may however be applied to valves having standard valve casings.

The seating face of the valve piece is formed of a soft metal ring 35 which is inserted or embedded in an annular groove in the lower face of the valve piece, and said ring engages an annular valve seat 36 herein shown as formed on the valve body around the opening 37 therein which connects the two sides of the valve. The valve face ring may extend beyond the valve piece proper for engagement with the valve seat 36, as shown in Fig. 1 and Fig. 2, or it may be embedded in the swivel valve piece with its seating face flush with the lower face of said valve piece, as shown in Fig. 4. In the latter figure said face ring is designated by 38. In the latter construction the valve seat is formed on a raised annular projection 39 integral with the valve body. The said swivel valve piece is provided with a downwardly projecting extension 42 that extends through a hard metal ring 43 that is screw-threaded in the opening 37 a distance below the valve seat. Said ring is provided at its upper end with an annular flange 44 which engages an upwardly facing annular surface of the valve body within the seat to limit the downward movement of the ring. The opening in said ring is formed at its upper side with a short flaring portion 45 and at its lower side with a wider flaring portion 46, and between said flaring portions with a cylindrical portion 47 which bounds the smallest or most restricted diameter of the ring opening. The extension 42 of the valve piece is tapered at its lower end to pass freely through the ring 43 and is formed at its upper end with a cylindrical portion 48 which constitutes the largest diameter of the extension and which, when the valve is seated fits closely in the restricted portion of the hard metal ring opening. The said extension 42 is hardened to resist wear due to the rapid flow or wire drawing of fluid through the restricted passage between the same and said ring when the valve first begins to open.

When the valve is raised off its seat, the engagement of the extension 42 with the hard metal ring prevents the passage of fluid through the valve immediately upon the raising of the swivel piece face ring off its seat, and thus prevents wire drawing on the valve seat and the facing ring. As the valve is further lifted the cylindric portion 48 of the extension 42 is withdrawn from the restricted portion of the hard metal ring to permit the flow of fluid through the valve. At this time the swivel valve piece facing ring is lifted a greater distance from the seat than the distance between the extension and hard metal ring, and, as a consequence, the flow of liquid will be relatively slower through the larger space between the face ring and valve seat than through the passage between the ring 43 and extension 42, and the wear due to the high velocity of the fluid will be brought principally upon the valve piece extension and hard metal ring. The hardened extension and ring are well capable of resisting such wear or wire drawing action and relieves the closing parts of the valve proper almost wholly, if not entirely of such wearing action of the fluid. Moreover by reason of the removability of the ring, said ring when worn may be replaced by a new ring, and thereby preserve the proper proportions between the ring and extension. The tapering of the extension and the flaring of the ring enables the area of the passage between the ring and extension to be varied as desired and thereby control the expansion of the fluid at this point at will.

It will be observed that the valve seat is located at such radial distance from the wall of the passage into which the extension projects that there will always be a larger space between the extension and the valve seat than between the extension and the said passage wall in all positions of the valve piece, whereby wear, due to wire drawing of the fluid, will always be brought upon the extension and ring.

Not only may the structure of the valve casing be varied but I may substitute for the soft metal facing rings a ground joint between the seat and valve piece.

The arrangement described provides an exceedingly simple construction for relieving the main seat and valve piece, which are relied upon to effect the closing of the valve, from wear due to the high velocity of the fluid passing through the valve, and to regulate the area of the valve opening so as to control the expansion of the fluid passing therethrough as desired.

It is practicable to make the ring 43 slightly softer than the projection of the valve piece so that said ring, which is readily replaceable, will take the greater part of the wear and may be economically replaced.

It will be obvious that the structural details of the valve may be slightly varied within the spirit and scope of the invention and the invention is not limited to such details except as made the subject of specific claims.

I claim as my invention.

1. A cut off and expansion valve having an annular valve seat surrounding the passage connecting the two sides of the valve, a valve piece movable toward and from, and adapted to engage, said seat to close the valve and an elongated hardened projection which enters said passage and is reduced or tapered toward its end and adapted to closely fit at its largest diameter the most restricted diameter of said passage at a distance from the plane of the valve seat, said passage being tapered or enlarged in the direction of flow of fluid through the valve, and the distance between the projection and valve seat being greater in all positions of the valve piece than that between the projection and the part of the wall of said passage engaged by said projection.

2. A combined cut off and expansion valve having an annular valve seat surrounding the passage which connects the two sides of the valve, a valve piece movable toward and from, and adapted to engage, said seat to close the valve, and a separately formed, removable and renewable ring fixed in said passage at a distance from the plane of the seat and enlarged or flared at its outer end in the direction of the flow of the fluid through the valve, the valve piece being provided with an elongated, tapered projection which enters said ring and is adapted to fit closely in the smallest diameter of said ring when the valve piece is seated, and to be withdrawn from the ring as the valve is opened.

3. A combined cut off and expansion valve comprising a casing provided with a valve seat which surrounds the passage that connects the two sides of the valve, a valve stem, a valve piece swiveled to the stem and adapted to engage said seat and a separately formed, removable and renewable ring fixed in said passage at a distance beyond the plane of the seat and tapered or enlarged in the direction of flow of the fluid through the valve, the valve piece being provided with an elongated projection which enters said ring and is tapered oppositely to said ring and arranged to closely fit at its largest part the smallest diameter of the ring.

In testimony, that I claim the foregoing as my invention I affix my signature in the presence of two witnesses, this 6th day of July A. D. 1909.

WILLIAM L. OSBORNE.

Witnesses:
W. L. HALL,
CARL H. CRAWFORD.